US012656135B2

(12) United States Patent (10) Patent No.: US 12,656,135 B2
Aoki et al. (45) Date of Patent: Jun. 16, 2026

(54) IN-VEHICLE APPARATUS

(71) Applicant: SUBARU CORPORATION, Tokyo (JP)

(72) Inventors: Yuto Aoki, Tokyo (JP); Junichi Motoyama, Tokyo (JP); Tsukasa Mikuni, Tokyo (JP); Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 18/774,174

(22) Filed: Jul. 16, 2024

(65) Prior Publication Data

US 2024/0369367 A1 Nov. 7, 2024

Related U.S. Application Data

(63) Continuation of application No. PCT/JP2023/013222, filed on Mar. 30, 2023.

(51) Int. Cl.
G01C 21/34 (2006.01)
(52) U.S. Cl.
CPC ................................ G01C 21/3461 (2013.01)
(58) Field of Classification Search
None
See application file for complete search history.

(56) References Cited

U.S. PATENT DOCUMENTS

2009/0245118 A1* 10/2009 McCormick ............ H04L 41/12
370/252
2014/0199980 A1* 7/2014 Rao ........................ H04W 4/18
455/418
2018/0321047 A1* 11/2018 Sagawa ................... H04L 67/34

FOREIGN PATENT DOCUMENTS

JP 2020-119467 A 8/2020
JP 2021-064185 A 4/2021
JP 2022-161253 A 10/2022

OTHER PUBLICATIONS

International Search Report received in PCT Application No. PCT/JP2023/013222, dated Jun. 13, 2023.

* cited by examiner

Primary Examiner — Anne Marie Antonucci
Assistant Examiner — Misa H Nguyen
(74) Attorney, Agent, or Firm — Rimon P.C.

(57) ABSTRACT

An in-vehicle apparatus includes a navigator, an area information extractor, a determiner, a notifier, a travel information obtainer, and a necessary time calculator. The navigator guides a vehicle in accordance with data on a traveling route. The area information extractor extracts a communication difficulty area and a restricted area from the data on the traveling route. The determiner determines whether the restricted area is included in the communication difficulty area. When the restricted area is included in the communication difficulty area, the notifier issues a preliminary notification indicating that the vehicle is to enter the restricted area to a predetermined notified party. The travel information obtainer acquires travel information on the traveling route. The necessary time calculator calculates necessary time to be taken from issuing the preliminary notification to passing through the communication difficulty area. The preliminary notification includes time from the preliminary notification to a next notification.

4 Claims, 9 Drawing Sheets

IN-VEHICLE APPARATUS

CROSS-REFERENCE TO RELATED APPLICATIONS

This application is continuation of International Application No. PCT/JP2023/013222, filed on Mar. 30, 2023, the entire contents of which are hereby incorporated by reference.

BACKGROUND

The disclosure relates to an in-vehicle apparatus. In recent years, as an in-vehicle apparatus that secures safety of an occupant in a vehicle, a system has been widely used that communicates with a server disposed outside the vehicle to issue a notification of the occurrence of an accident or the like of the vehicle to the server.

However, when the vehicle is in an area of a poor electric wave condition, such as inside a large tunnel, it is difficult for the in-vehicle apparatus to communicate with the server to issue a necessary notification.

To address the above-described issue, Japanese Unexamined Patent Application Publication (JP-A) No. 2020-119467, for example, discloses an emergency notification system that includes an in-vehicle apparatus to be applied to a vehicle, and a server that is configured to communicate with the in-vehicle apparatus.

The in-vehicle apparatus includes a position identifier, an in-vehicle communicator, an in-vehicle storage, a non-communication identifier, a stand-by time calculator, a pre-call transmitter, and a cancellation transmitter. The position identifier identifies a vehicle position. The in-vehicle communicator establishes wireless communication with the server. The in-vehicle storage stores an electric wave map indicating areas where wireless communication is available. The non-communication identifier identifies a non-communication traveling route on which the wireless communication is difficult to be established. The stand-by time calculator calculates stand-by time that is longer than the time to be taken by the vehicle to travel on the non-communication traveling route. The pre-call transmitter transmits a pre-call including the stand-by time to the server before the vehicle enters the non-communication traveling route. The cancellation transmitter transmits a cancellation notification to cancel the pre-call to the server when the vehicle passes through the non-communication traveling route.

SUMMARY

An aspect of the disclosure provides an in-vehicle apparatus to be applied to a vehicle. The in-vehicle apparatus includes a navigator, an area information extractor, a determiner, a notifier, a travel information obtainer, and a necessary time calculator. The navigator is configured to guide the vehicle in accordance with on data on a determined traveling route. The area information extractor is configured to extract a communication difficulty area in which a communication state is deteriorated, and a restricted area set in advance, from the data on the determined traveling route. The determiner is configured to determine whether the restricted area is included in the communication difficulty area. The notifier is configured to, when the restricted area is included in the communication difficulty area, issue a preliminary notification indicating that the vehicle is to enter the restricted area to a predetermined notified party before the vehicle enters the communication difficulty area. The travel information obtainer is configured to acquire travel information on the determined traveling route. The necessary time calculator is configured to calculate necessary time to be taken from issuing the preliminary notification to passing through the communication difficulty area based on the travel information on the determined traveling route acquired by the travel information obtainer. The preliminary notification issued by the notifier includes the time from the preliminary notification to the next notification.

An aspect of the disclosure provides an in-vehicle apparatus to be applied to a vehicle. The in-vehicle apparatus includes one or more processors, one or more memories communicably coupled to the one or more processors, and a notifier configured to issue a preliminary notification indicating that the vehicle is to enter a restricted area set in advance. The one or more memories are configured to store data including map data on routes, data on a communication difficulty area in which a communication state is deteriorated, and data on the restricted area. The one or more memories are configured to guide the vehicle in accordance with data on a determined traveling route. The one or more memories are configured to extract the communication difficulty area and the restricted area from the data on the determined traveling route. The one or more memories are determine whether the restricted area is included in the communication difficulty area. The one or more memories are configured to control the notifier. The one or more memories are configured to acquire travel information on the determined traveling route. The one or more memories are configured to calculate necessary time to be taken from issuing the preliminary notification to passing through the communication difficulty area, based on the travel information on the determined traveling route acquired by the travel information obtainer. The one or more memories are configured to, when the restricted area is included in the communication difficulty area, cause the notifier to issue the preliminary notification indicating that the vehicle is to enter the restricted area to a predetermined notified party before the vehicle enters the communication difficulty area. The preliminary notification issued by the notifier includes the time from the preliminary notification to the next notification.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
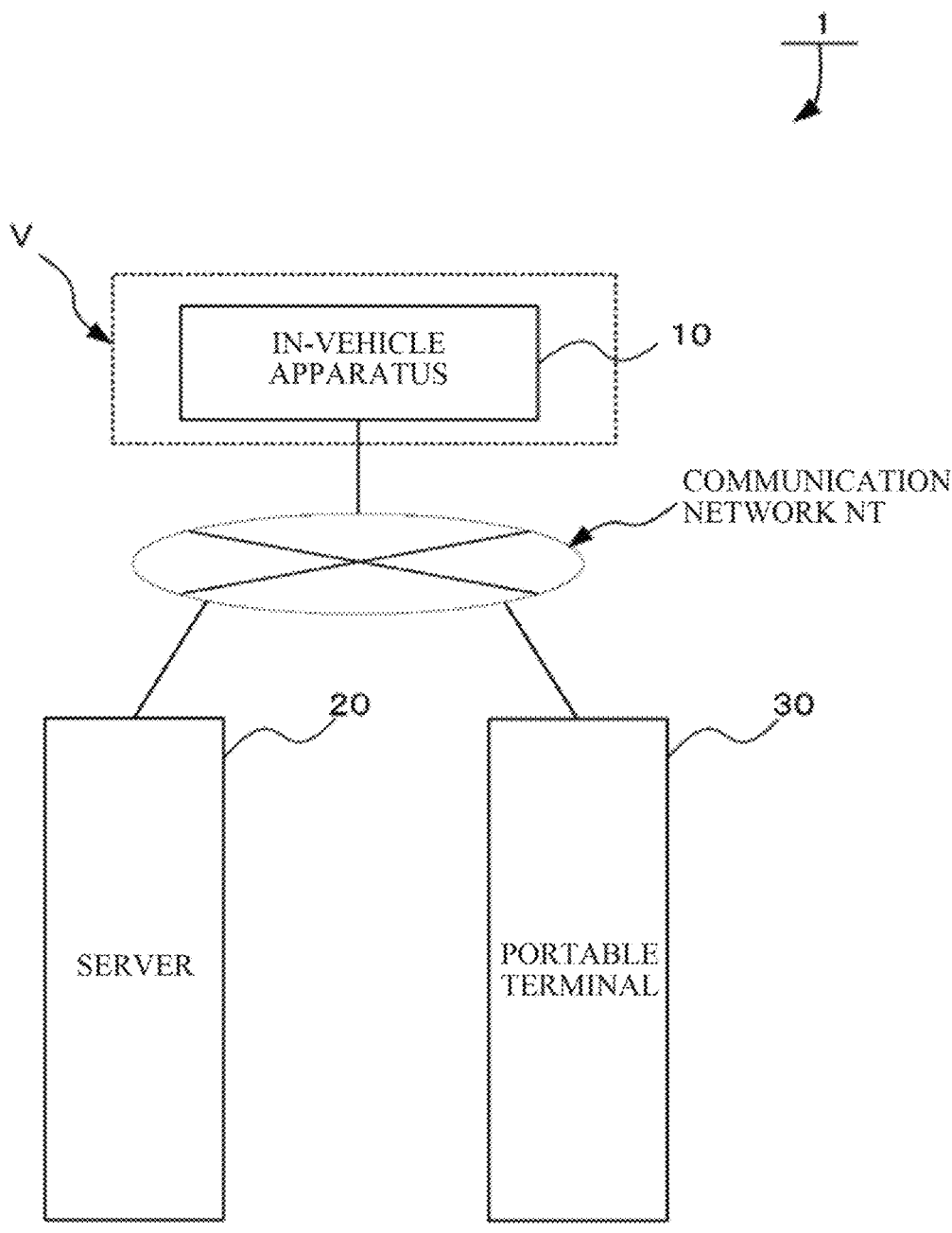
FIG. 1 is a block diagram illustrating a configuration of a vehicle communication system according to one example embodiment of the disclosure.

There are some cases where the entry of an occupant of a vehicle into an area set in advance as a geofence is restricted. When an own vehicle in which an in-vehicle apparatus is mounted enters the restricted area set as the geofence, an in-vehicle apparatus notifies the occupant of the vehicle and an owner of the vehicle outside the vehicle or the like of the fact that the own vehicle has entered the restricted area, for example.

However, the technique disclosed in JP-A No. 2020-119467 fails to take into consideration the restricted area set as the geofence. Accordingly, when the restricted area is included in a communication difficulty area, it is difficult for the in-vehicle apparatus to notify a predetermined notified person outside the vehicle of the fact as to whether the vehicle has entered the restricted area.

It is desirable to provide an in-vehicle apparatus that issues a notification to a predetermined notified party at an appropriate timing even when a restricted area on a traveling route is included in a communication difficulty area.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Now, in-vehicle apparatuses 10 and 10A according to example embodiments of the disclosure that are included in vehicle communication systems 1 and 1A, respectively, are described with reference to FIGS. 1 to 9.

First Example Embodiment

First, the in-vehicle apparatus 10 according to a first example embodiment is described with reference to FIGS. 1 to 4.

<Vehicle Communication System 1>

As illustrated in FIG. 1, the vehicle communication system 1 may include the in-vehicle apparatus 10, according to the first example embodiment, disposed in an own vehicle V, a server 20 disposed outside the own vehicle V, and a portable terminal 30 receiving and transmitting data.

The in-vehicle apparatus 10 according to the first example embodiment may control an overall operation of the vehicle communication system 1, based on a control program stored in a read-only memory (ROM) that is included in the in-vehicle apparatus 10. Further, when the own vehicle V is to enter a restricted area GF set as a geofence, for example, the in-vehicle apparatus 10 may perform control to notify the portable terminal 30 designated as a predetermined notified party, of the fact via a communication network NT.

Herein, the restricted area GF may be an area that is set in advance as a geofence to the in-vehicle apparatus 10 and that the own vehicle V is prohibited from entering.

Details of the in-vehicle apparatus 10 are to be described later.

The server 20 may be disposed outside the own vehicle V, and may store map data, surrounding area data, traffic congestion data, and the like to be used in driver assistance control or automated driving control, for example. The server 20 and the in-vehicle apparatus 10 may wirelessly communicate with each other via a non-illustrated wireless communication base station. The server 20 may transmit the data to the in-vehicle apparatus 10 in response to a request from the in-vehicle apparatus 10.

The portable terminal 30 may be a device owned by an owner of the own vehicle V or a guardian of the occupant of the own vehicle V designated as a predetermined notified party. The portable terminal 30 may receive a notification from the in-vehicle apparatus 10.

<In-Vehicle Apparatus 10>

Figure 2:
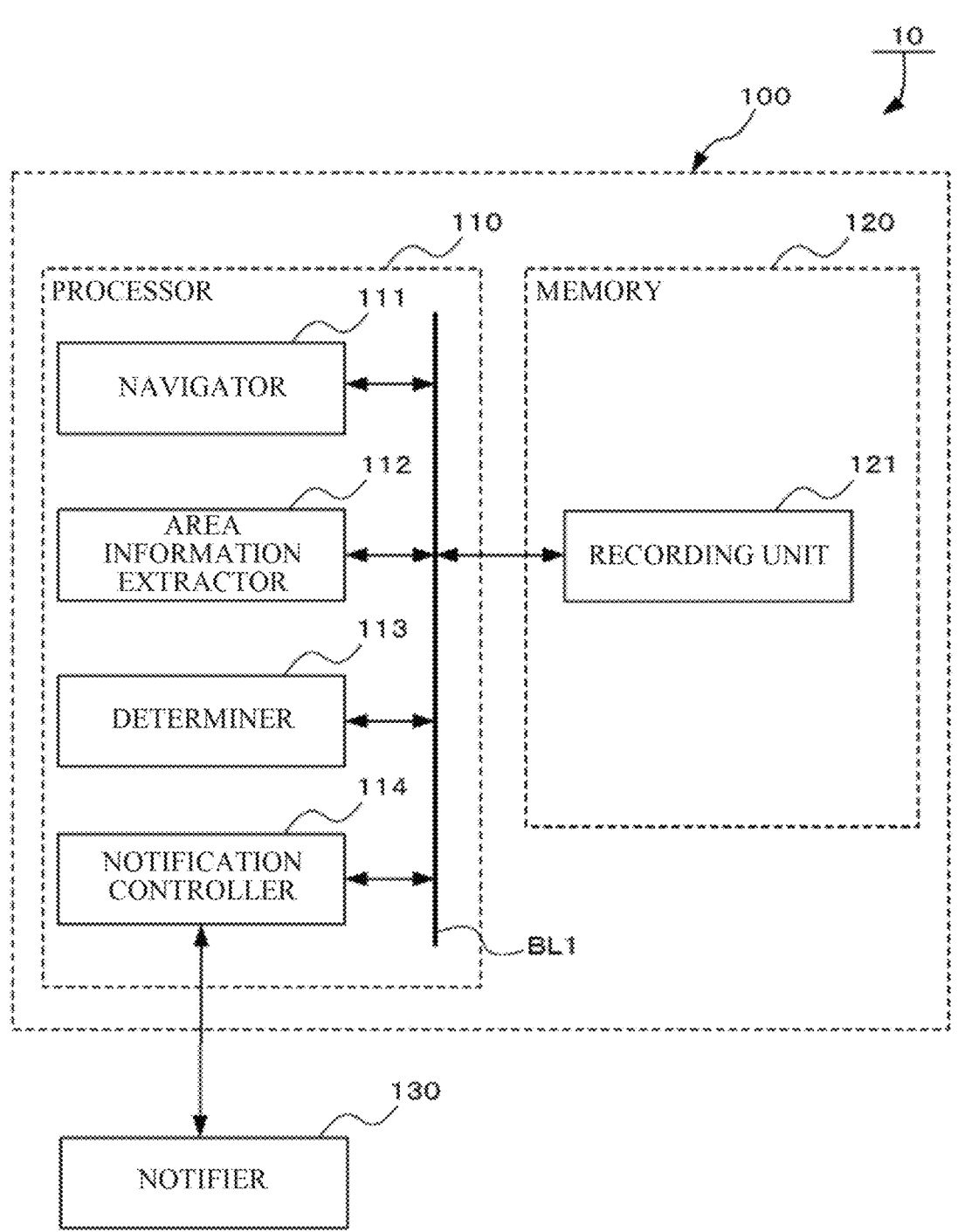
FIG. 2 is a block diagram illustrating a configuration of an in-vehicle apparatus according to one example embodiment of the disclosure.

As illustrated in FIG. 2, the in-vehicle apparatus 10 includes a processor unit 100 and a notifier 130.

<Configuration of Processor Unit 100>

The processor unit 100 includes a processor 110 and a memory 120. The processor unit 100 may control an overall operation of the in-vehicle apparatus 10, based on a control program stored in a read-only memory (ROM) that is included in the memory 120.

The processor 110 includes a navigator 111, an area information extractor 112, a determiner 113, and a notification controller 114.

The memory 120 includes a recording unit 121.

The navigator 111, the area information extractor 112, the determiner 113, and the notification controller 114 in the processor 110 and the memory 120 may be coupled to each other via a bus line BL1.

The navigator 111 guides the own vehicle V along a traveling route RA, which is data on a determined traveling route.

In other words, the navigator 111 may perform normal traveling route guidance in which the traveling route RA from a current position of the own vehicle V to a destination is set based on the map data and the traffic data received from the server 20, and the own vehicle V is guided to the destination along the traveling route RA.

When the restricted area GF is set in advance to the in-vehicle apparatus 10, for example, the navigator 111 may perform the normal traveling route guidance, taking into consideration the restricted area GF.

The navigator 111 may detect the current position of the own vehicle V based on electric waves transmitted from the GPS satellites to a global positioning system (GPS) receiver mounted in the navigator 111, for example.

The data on the current position of the own vehicle V identified by the navigator 111 may be transmitted to the area information extractor 112, the determiner 113, and the notification controller 114 via the bus line BL1.

The area information extractor 112 extracts a communication difficulty area WR and the restricted area GF included in the traveling route RA.

Figure 3:
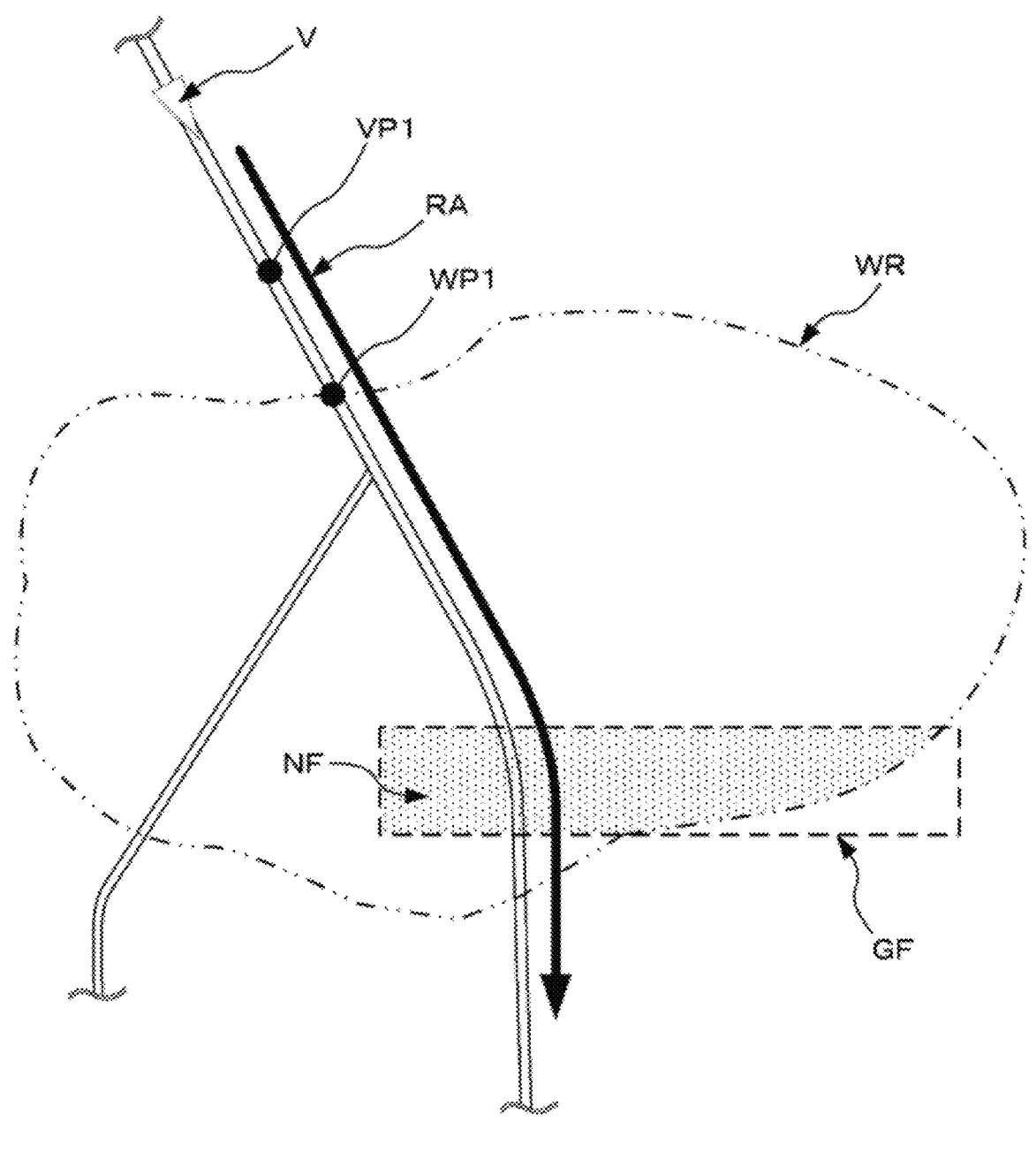
FIG. 3 is a diagram illustrating a traveling route of an own vehicle including the in-vehicle apparatus according to one example embodiment.

For example, as illustrated in FIG. 3, when the communication difficulty area WR and the restricted area GF are included in the map data downloaded from the server 20, the area information extractor 112 may extract the communication difficulty area WR and the restricted area GF from the map data, and transmit the data on the communication difficulty area WR and the restricted area GF to the determiner 113 via the bus line BL1.

The area information extractor 112 may extract the communication difficulty area WR by acquiring the electric field strength of electric waves used for the wireless communication with the server 20 from the notifier 130.

For instance, the area information extractor 112 may acquire data on the electric field strength of transmission/ reception electric waves, or data on the error rate of the communication data from the notifier 130.

The area information extractor 112 may determine whether the electric field strength or the error rate is greater than or equal to a predetermined value of the electric field strength or a predetermined value of the error rate of the communication data that is stored in advance in the memory 120.

Thereafter, when the electric field strength or the error rate that is greater than or equal to the predetermined value becomes less than the predetermined value, the area information extractor 112 may transmit data indicating that the own vehicle V is approaching the communication difficulty area WR to the determiner 113.

When the electric field strength or the error rate that is less than the predetermined value becomes greater than or equal to the predetermined value, the area information extractor 112 may transmit data indicating that the own vehicle V has passed through the communication difficulty area WR to the determiner 113.

The determiner 113 determines whether the restricted area GF is included in the communication difficulty area WR.

For example, based on the data on the communication difficulty area WR and the restricted area GF received from the area information extractor 112, the determiner 113 may determine whether a communication difficulty restricted area NF is present. As being dot-hatched in FIG. 3, the communication difficulty restricted area NF may be a part of the restricted area GF included in the communication difficulty area WR.

Further, the determiner 113 acquires the traveling route RA from the navigator 111 to determine whether the traveling route RA extends through the communication difficulty restricted area NF.

Based on the data indicating that the own vehicle V is approaching the communication difficulty area WR or the data indicating that the own vehicle V has passed through the communication difficulty area WR received from the area information extractor 112, the determiner 113 may determine whether the own vehicle V is approaching the communication difficulty area WR or the own vehicle V has passed through the communication difficulty area WR.

The determiner 113 may transmit a result of the determination to the notification controller 114.

When the restricted area GF is included in the communication difficulty area WR, the notification controller 114 causes the notifier 130 to issue a preliminary notification indicating that the own vehicle V is to enter the restricted area GF to the predetermined notified party before the own vehicle V enters the communication difficulty area WR.

For example, when a traveling route indicated by a thick solid arrow in FIG. 3 is determined as the traveling route RA of the own vehicle V, the notification controller 114 may receive, from the determiner 113, the result of the determination as to whether the communication difficulty restricted area NF is present on the traveling route RA.

Based on the data indicating that the communication difficulty restricted area NF is present on the traveling route RA, the notification controller 114 may perform control to issue the preliminary notification indicating that the own vehicle V is to enter the restricted area GF to the predetermined notified party at a time point when the own vehicle V travels through an approach determination point VP1.

Herein, the approach determination point VP1 may be a point where the preliminary notification is issued to the predetermined notified party before the own vehicle V enters the communication difficulty area WR.

For example, the approach determination point VP1 may be a point located a predetermined distance before a communication difficulty area entrance point WP1 where the communication difficulty area WR and the traveling route RA intersect with each other first on the map in a traveling direction of the own vehicle V.

The predetermined distance may be, for example, 1 kilometer from the communication difficulty area entrance point WP1 on the traveling route RA. The approach determination point VP1 may be, for example, a point where the notification controller 114 receives, from the determiner 113, the result of the determination indicating that the own vehicle V is approaching the communication difficulty area WR.

When the restricted area GF is included in the communication difficulty area WR, the notifier 130 issues the preliminary notification indicating that the own vehicle V is to enter the restricted area GF to the portable terminal 30 under the control by the notification controller 114 before the own vehicle V enters the communication difficulty area WR.

The notifier 130 may include a non-illustrated in-vehicle communicator to establish wireless communication with the server 20 via the communication network NT under the control by the notification controller 114.

Further, the notifier 130 may communicate with the server 20 disposed outside the own vehicle V under the control by the notification controller 114 to download the map data, the surrounding area data, the traffic congestion data, and the like for the determination of the traveling route RA, for example, from the server 20. The downloaded data may be stored in the memory 120.

<Process in In-Vehicle Apparatus 10>

Figure 4:
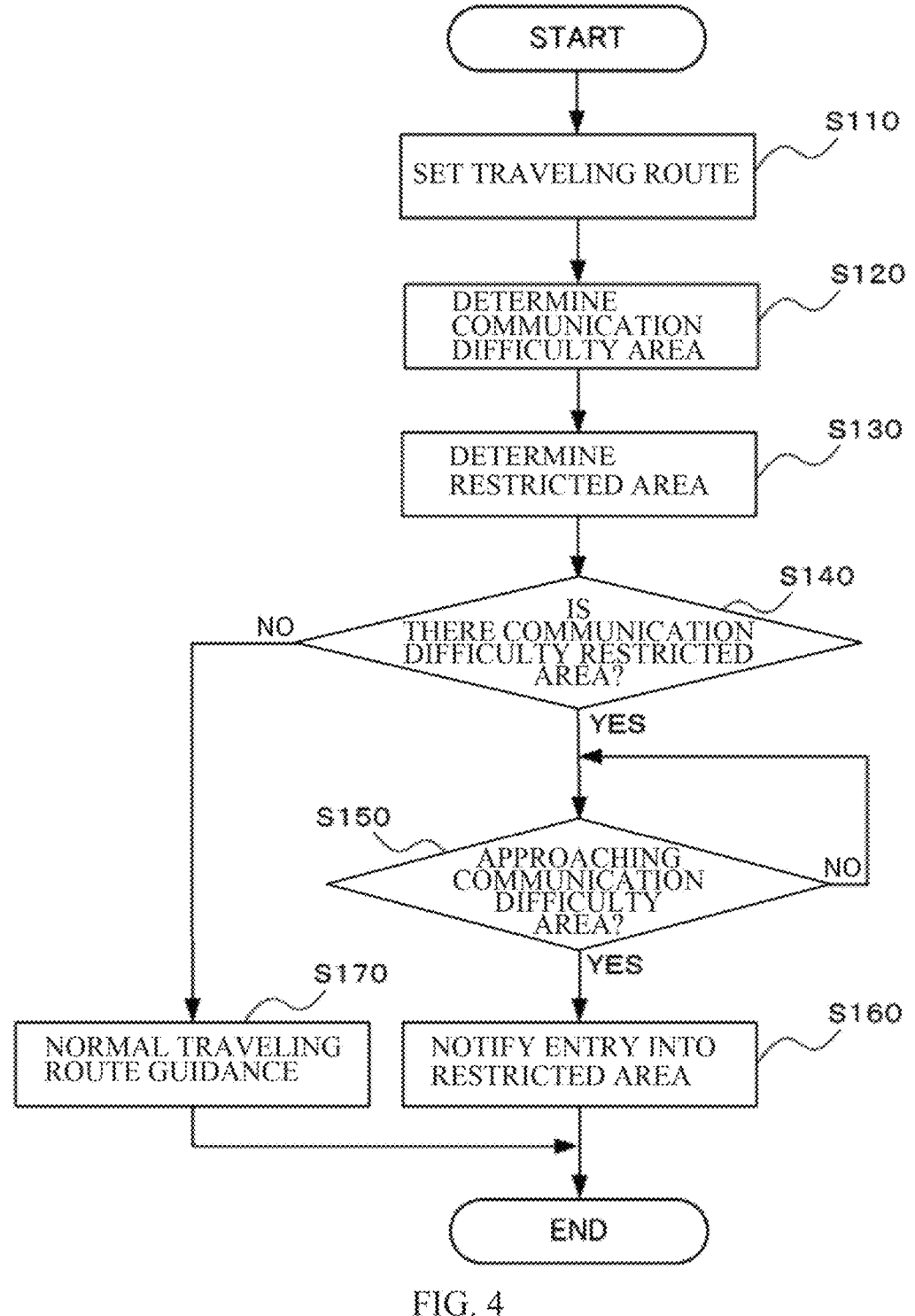
FIG. 4 is a flowchart of a process performed by the in-vehicle apparatus according to one example embodiment of the disclosure.

A process performed by the in-vehicle apparatus 10 according to the first example embodiment will now be described with reference to FIG. 4.

Based on the current position of the own vehicle V and the destination inputted by the occupant, the navigator 111 may cause a non-illustrated route searcher to search for a potential route, and may set the potential route as the traveling route RA (Step S110).

When receiving a notification of the traveling route RA from the navigator 111, the area information extractor 112 may acquire, from the recording unit 121, the data on the communication difficulty area WR and the restricted area GF on the traveling route RA, based on the notification of the traveling route RA. Thereafter, the area information extractor 112 may transmit the acquired data to the determiner 113.

The determiner 113 may determine whether the communication difficulty area WR is present on the traveling route RA (Step S120).

Thereafter, the determiner 113 may determine whether the restricted area GF is present on the traveling route RA (Step S130).

Thereafter, the determiner 113 may determine whether the communication difficulty restricted area NF is present on the traveling route RA (Step S140).

When the determiner 113 determines that the communication difficulty restricted area NF is not present on the traveling route RA (Step S140: NO), the process may proceed to Step S170 in which the normal traveling route guidance is performed. Thereafter, the process may be terminated.

In contrast, when determining that the communication difficulty restricted area NF is present on the traveling route RA (Step S140: YES), the determiner 113 may determine whether the own vehicle V is approaching the communication difficulty area WR, based on the data received from the area information extractor 112 (Step S150).

When the determiner 113 determines that the own vehicle V is not approaching the communication difficulty area WR (Step S150: NO), the process may repeat Step S150.

In contrast, when determining that the own vehicle V is approaching the communication difficulty area WR (Step S150: YES), the determiner 113 may transmit data indicating that the own vehicle V is approaching the communication difficulty area WR to the notification controller 114. The notification controller 114 may cause the notifier 130 to issue the notification indicating that the own vehicle V is to enter the restricted area GF to the portable terminal 30 (Step S160). Thereafter, the process may be terminated.

<Workings and Effects>

As described above, the in-vehicle apparatus 10 according to the first example embodiment includes the navigator 111, the area information extractor 112, the determiner 113, and the notifier 130. The navigator 111 guides the own vehicle V along the traveling route RA, which is the data on the determined traveling route. The area information extractor 112 extracts, from the determined traveling route RA, the communication difficulty area WR in which the communication state is deteriorated, and the restricted area GF set in advance. The determiner 113 determines whether restricted area GF is included in the communication difficulty area WR. When the restricted area GF is included in the communication difficulty area WR, the notifier 130 issues the preliminary notification indicating that the own vehicle V is to enter the restricted area GF to the portable terminal 30 designated as the predetermined notified party, before the own vehicle V enters the communication difficulty area WR.

That is, the navigator 111 determines the traveling route RA, and transmits the data on the current position of the own vehicle V to the determiner 113 and the notification controller 114. The area information extractor 112 extracts the communication difficulty area WR and the restricted area GF from the traveling route RA, and transmits the extracted data to the determiner 113. Based on the data on the current position of the own vehicle V and the data on the communication difficulty area WR and the restricted area GF, the determiner 113 determines whether the communication difficulty restricted area NF, which is the part of the restricted area GF included in the communication difficulty area WR, is present. Further, the determiner 113 determines whether the communication difficulty restricted area NF is present on the traveling route RA.

When determining that the communication difficulty restricted area NF is present on the traveling route RA, the determiner 113 transmits the data indicating that the communication difficulty restricted area NF is present on the traveling route RA to the notification controller 114. Thereafter, the notification controller 114 causes the notifier 130 to issue the preliminary notification indicating that the own vehicle V is to enter the restricted area GF to the portable terminal 30 at the approach determination point VP1. The approach determination point VP1 may be a point through which the own vehicle V is to pass through before entering the communication difficulty area WR.

Accordingly, it is possible to issue a notification to a predetermined notified party at an appropriate timing even when the restricted area GF on the traveling route RA is included in the communication difficulty area.

Second Example Embodiment

Now, the in-vehicle apparatus 10A according to a second example embodiment is described with reference to FIGS. 5 to 9.

<Vehicle Communication System 1A>

Figure 5:
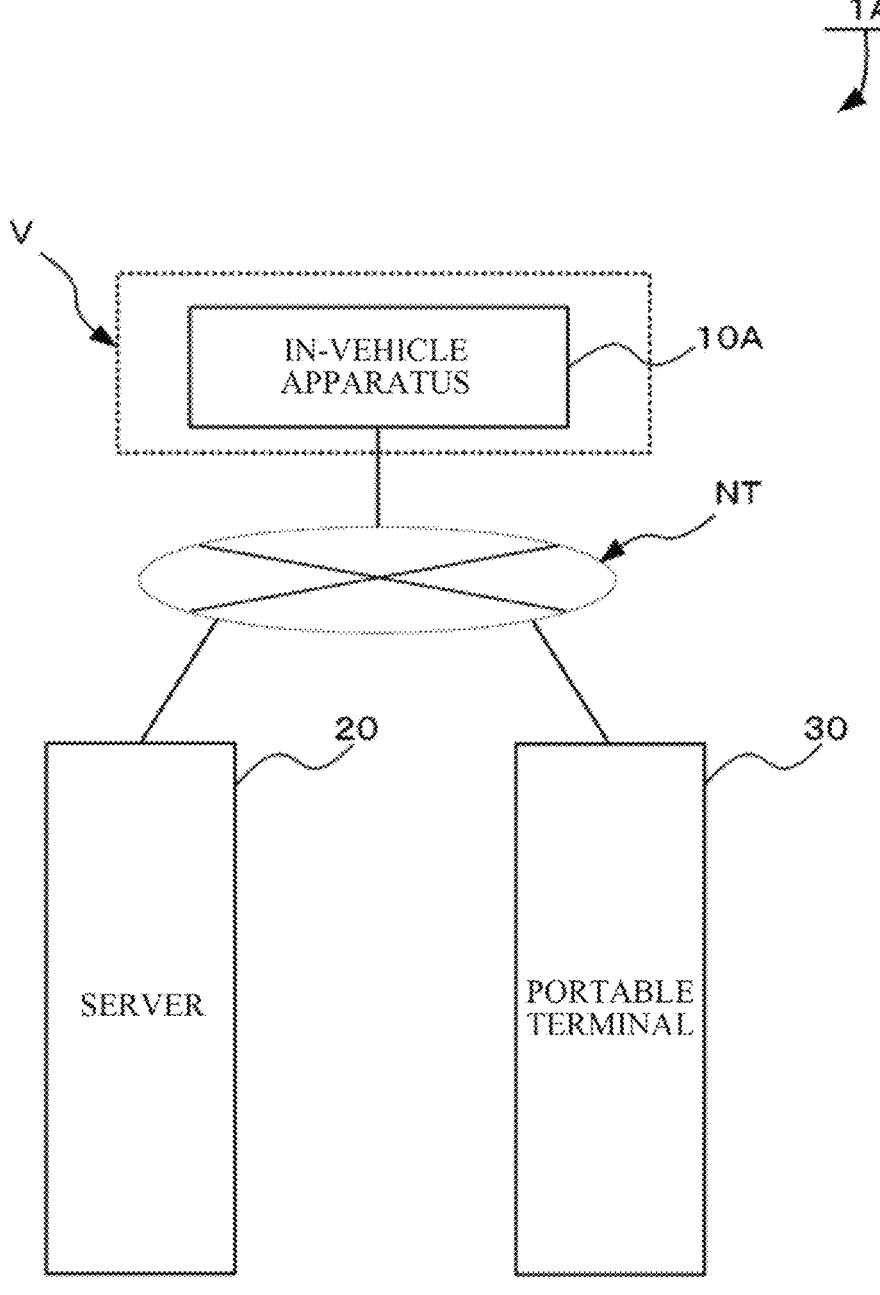
FIG. 5 is a block diagram illustrating a configuration of a vehicle communication system according to one example embodiment of the disclosure.

As illustrated in FIG. 5, the vehicle communication system 1A may include the in-vehicle apparatus 10A according to the second example embodiment disposed in the own vehicle V, the server 20 disposed outside the own vehicle V, and the portable terminal 30.

Note that the components denoted with the same reference numerals as those in the first example embodiment operate similarly to the respective components in the first example embodiment, and detailed descriptions thereof are omitted herein.

<In-Vehicle Apparatus 10A>

Figure 6:
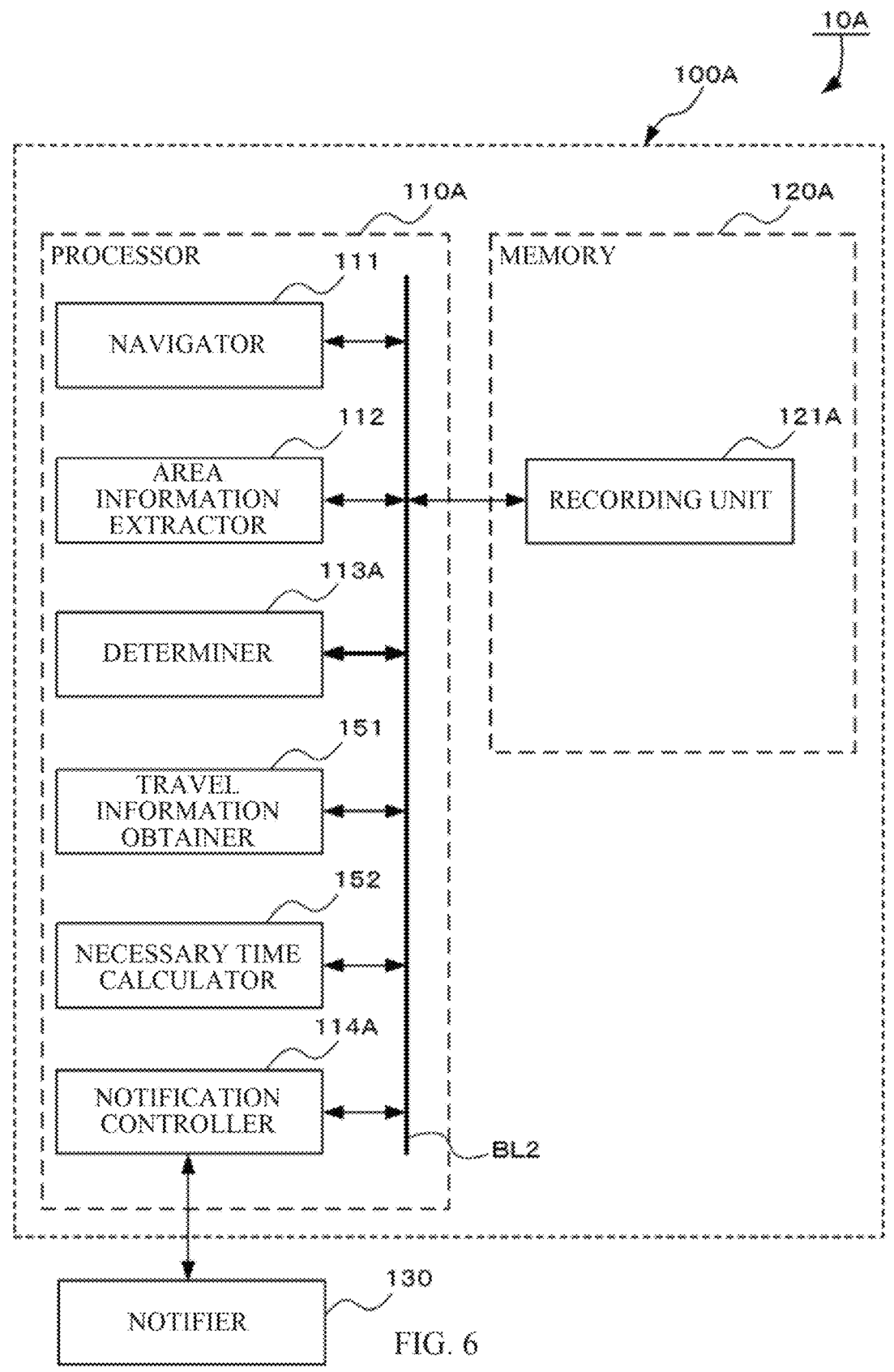
FIG. 6 is a diagram illustrating a configuration of an in-vehicle apparatus according to one example embodiment of the disclosure.

As illustrated in FIG. 6, the in-vehicle apparatus 10A includes a processor unit 100A and the notifier 130.

<Configuration of Processor Unit 100A>

The processor unit 100A includes a processor 110A and a memory 120A. The processor unit 100A may control an overall operation of the in-vehicle apparatus 10A, based on a control program stored in a read-only memory (ROM) included in the memory 120A.

The processor 110A includes the navigator 111, the area information extractor 112, a determiner 113A, a notification controller 114A, a travel information obtainer 151, and a necessary time calculator 152.

The memory 120A includes a recording unit 121A.

The navigator 111, the area information extractor 112, the determiner 113A, the notification controller 114A, the travel information obtainer 151, and the necessary time calculator 152 in the processor 110A and the recording unit 121A may be coupled to each other via a bus line BL2.

The determiner 113A may determine whether the own vehicle V is in the communication difficulty area WR or has passed through the communication difficulty area WR.

For example, the determiner 113A may determine whether the own vehicle V is in the communication difficulty area WR or has passed through the communication difficulty area WR based on the data on the current position of the own vehicle V received from the navigator 111 and the data on the communication difficulty area WR received from the area information extractor 112.

The determiner 113A may transmit a result of the determination to the notification controller 114A.

When the communication difficulty restricted area NF is present on the traveling route RA, the notification controller 114A may acquire travel information on the traveling route RA from the travel information obtainer 151 to be described later.

Further, the notification controller 114A may acquire, from the necessary time calculator 152, necessary time t1 to travel from the approach determination point VP1 to a communication difficulty area exit point WP2, as the time from the preliminary notification to the next notification.

Further, at the time point when the own vehicle V has passed through the communication difficulty area WR, the notification controller 114A may cause the notifier 130 to notify the predetermined notified party of necessary time t2.

In addition, at the time point when the own vehicle V has passed through the communication difficulty area WR, the notification controller 114A may cause the notifier 130 to notify the predetermined notified party of the travel information on the own vehicle V. In this case, the travel information on the own vehicle V may be the status of entry of the own vehicle V into the restricted area GF. The status of entry of the own vehicle V into the restricted area GF may include information regarding the passage of the own vehicle V through restricted area GF or the stay of the own vehicle V in the restricted area GF.

Figure 7:
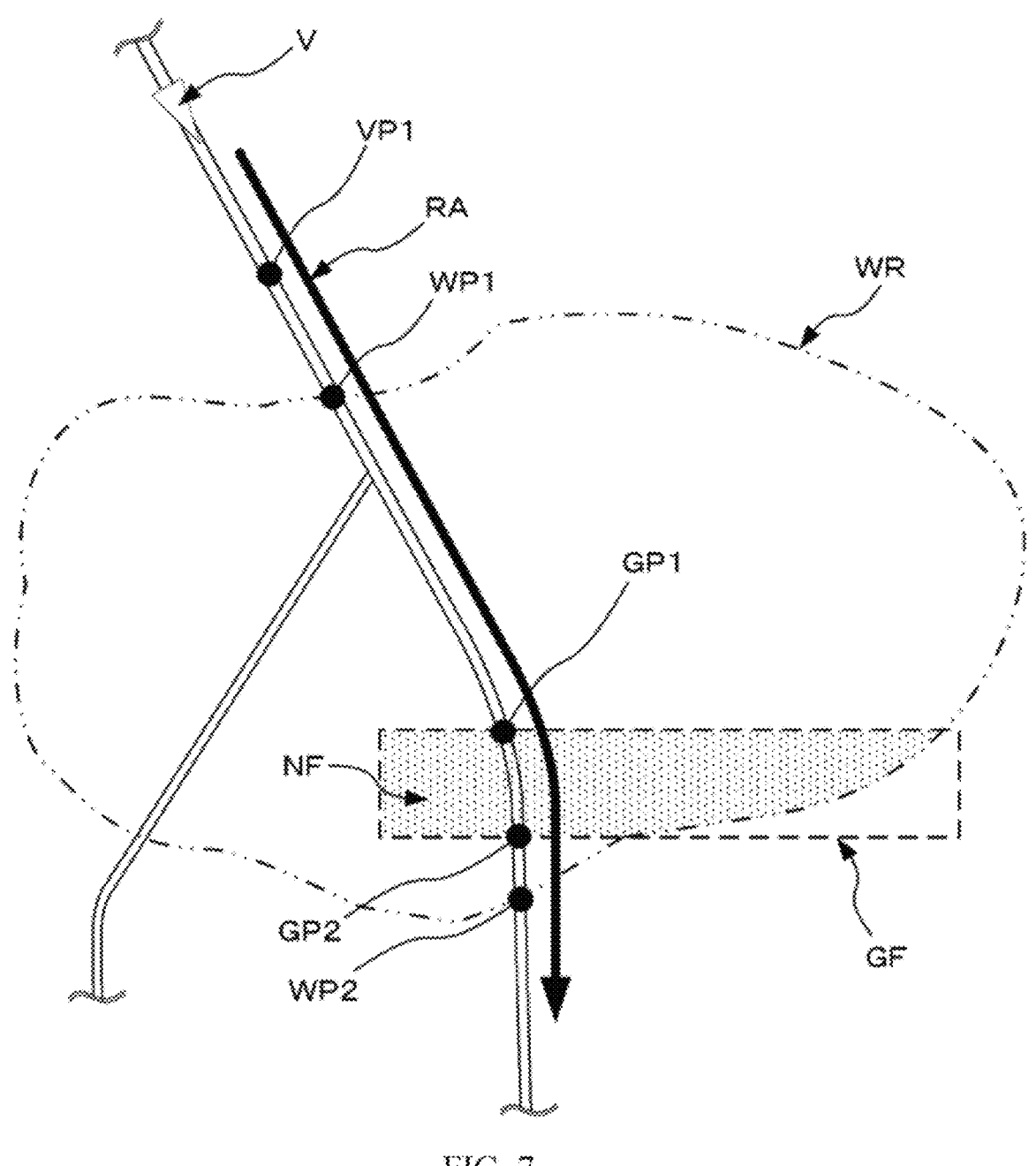
FIG. 7 is a diagram illustrating a traveling route of the own vehicle in which the in-vehicle apparatus according to one example embodiment is mounted.

For example, when a traveling route indicated by a thick solid arrow in FIG. 7 is determined as the traveling route RA of the own vehicle V, the notification controller 114A may receive, from the determiner 113A, the result of the determination as to whether the communication difficulty restricted area NF is present on the traveling route RA.

Based on the data indicating that the communication difficulty restricted area NF is present on the traveling route RA, the notification controller 114A may perform the control to issue the preliminary notification to the predetermined notified party at the approach determination point VP1.

When the own vehicle V enters the restricted area GF, the notification controller 114A may store the travel information on traveling of the own vehicle V in the restricted area GF in the recording unit 121A.

After the own vehicle V passes through the communication difficulty area WR, the notification controller 114A may notify the predetermined notified party of the status of entry of the own vehicle V into the restricted area GF. The status of entry of the own vehicle into the restricted area GF may include the information regarding the passage of the own vehicle V through restricted area GF or the stay of the own vehicle V in restricted area GF.

In addition, the notification controller 114A may acquire, from the necessary time calculator 152, the time of passing through a transit point within the restricted area GF, and may store the data on the recording unit 121A.

Figure 8:
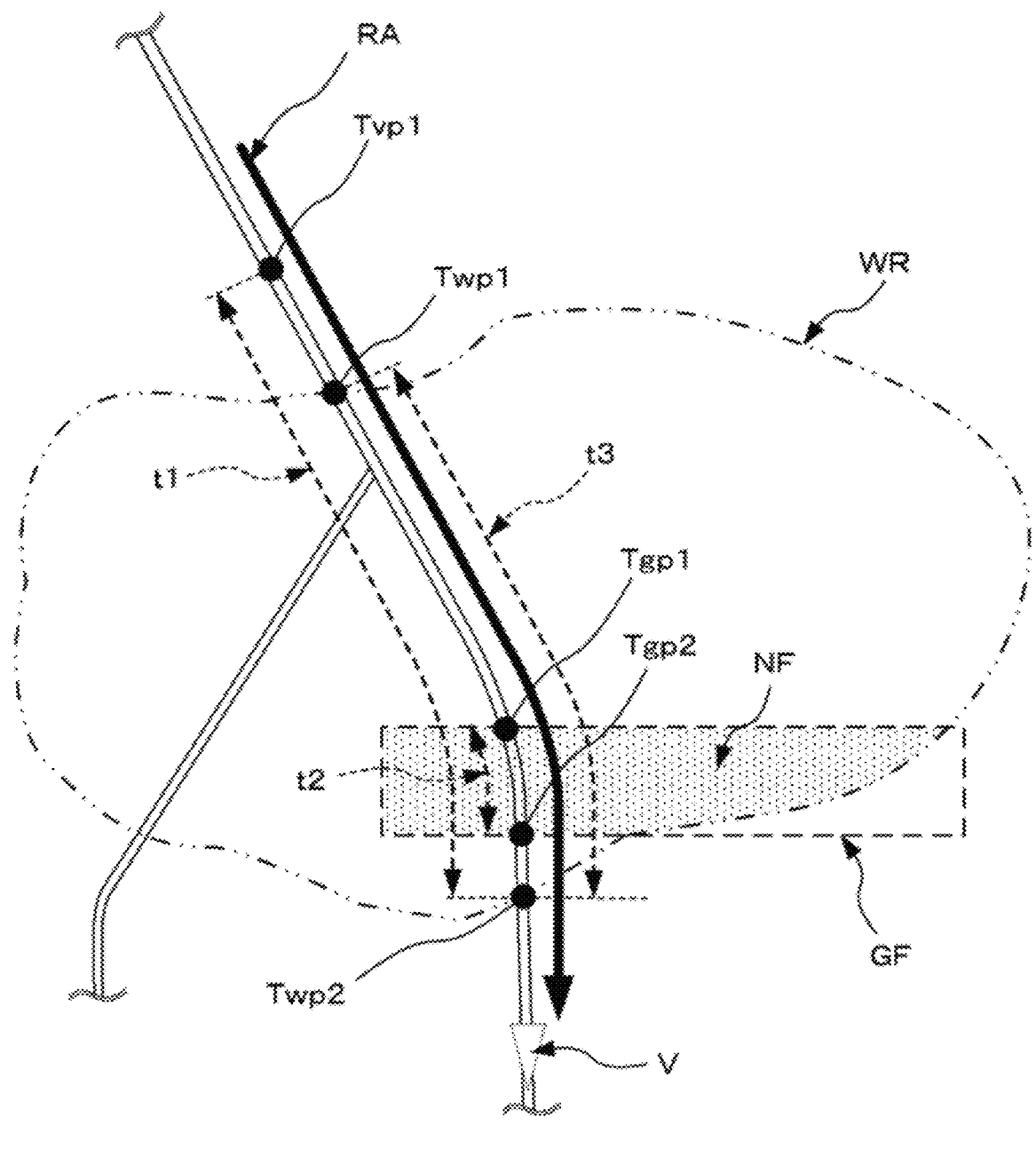
FIG. 8 is a diagram illustrating the time when the own vehicle in which the in-vehicle apparatus according to one example embodiment is mounted passes through each transit point on the traveling route.

In this case, as illustrated in FIG. 8, the travel information on the own vehicle V may be, for example, information on transit points on the traveling route RA and the time of passing through the transit points.

When the communication difficulty restricted area NF is present on the traveling route RA, the travel information on the own vehicle V may be, for example, information on the time of passing Tgp1 through a restricted area entrance point GP1 on the traveling route RA, the time of passing Tgp2 through a restricted area exit point GP2, the time of stay Tst in the restricted area GF, the necessary time t1 to travel from the approach determination point VP1 to the communication difficulty area exit point WP2, and the necessary time t2 to pass through the restricted area GF.

Alternatively, the notification controller 114A may acquire traffic data on the traveling route RA from the navigator 111 after the own vehicle V passes through the communication difficulty area WR, and may cause the notifier 130 to notify the portable terminal 30 of the traffic data on the traveling route RA together with the travel information on the own vehicle V.

The travel information obtainer 151 may acquire the travel information on traveling of the own vehicle V on the traveling route RA.

For example, the travel information obtainer 151 may acquire the travel information including, for example, data on the transit points on the traveling route RA, data on speeds of the own vehicle V at the transit points, data on a stop of traveling, data on engine-on/off operations, and may store the travel information in the recording unit 121A.

Based on the travel information on the traveling route RA, the necessary time calculator 152 may calculate the necessary time t1 to travel from the approach determination point VP1 at which the preliminary notification is issued to the communication difficulty area exit point WP2.

For example, when the own vehicle V enters the communication difficulty area WR, the necessary time calculator 152 may acquire the time of passing Twp1 through the communication difficulty area entrance point WP1 and the time of passing Twp2 through the communication difficulty area exit point WP2, and may store the data in the recording unit 121A.

When the own vehicle V enters the restricted area GF, the necessary time calculator 152 may acquire the time of passing Tgp1 through the restricted area entrance point GP1 and the time of passing Tgp2 through the restricted area exit point GP2, and may store the data in the recording unit 121A.

Thereafter, the necessary time calculator 152 may calculate the necessary time to travel the distance between the transit points on the traveling route RA.

The necessary time calculated by the necessary time calculator 152 may be, for example, the necessary time t1 to travel from the approach determination point VP1 to the communication difficulty area exit point WP2, the necessary time t2 to pass through the restricted area GF, and necessary time t3 to pass through the communication difficulty area WR.

Note that the necessary time calculator 152 may acquire traffic data such as traffic congestion data on the traveling route RA at the time point when the own vehicle V has passed through the communication difficulty area WR, and may correct the necessary time taken by the own vehicle V to pass through the communication difficulty area WR, taking into consideration the traffic data.

<Process in In-Vehicle Apparatus 10A>

Figure 9:
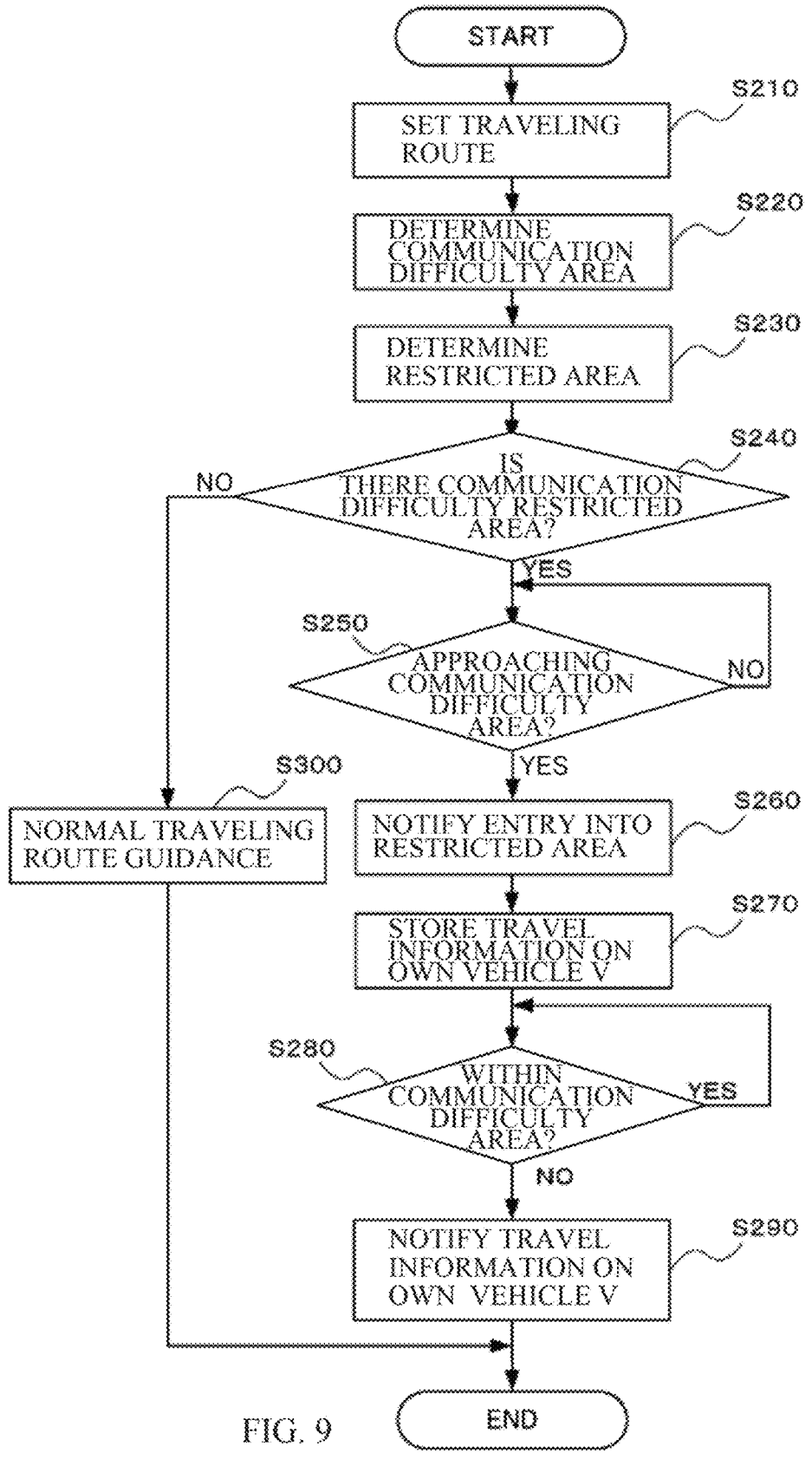
FIG. 9 is a flowchart of a process performed by the in-vehicle apparatus according to one example embodiment of the disclosure.

A process performed by the in-vehicle apparatus 10A according to the second example embodiment will now be described with reference to FIG. 9.

Based on the current position of the own vehicle V and the destination inputted by the occupant, the navigator 111 may cause the non-illustrated route searcher to search for a potential route, and may set the potential route as the traveling route RA (Step S210).

When receiving the notification of the traveling route RA from the navigator 111, the area information extractor 112 may acquire, from the recording unit 121A, the data on the communication difficulty area WR and the restricted area GF on the traveling route RA, based on the notification of the traveling route RA. Thereafter, the area information extractor 112 may transmit the acquired data to the determiner 113A.

The determiner 113A may determine whether the communication difficulty area WR is present on the traveling route RA (Step S220).

Thereafter, the determiner 113A may determine whether the restricted area GF is present on the traveling route RA (Step S230).

Thereafter, the determiner 113A may determine whether the communication difficulty restricted area NF is present on the traveling route RA (Step S240).

When the determiner 113A determines that the communication difficulty restricted area NF is not present on the traveling route RA (Step S240: NO), the process may proceed to Step S300 in which the normal traveling route guidance is performed. Thereafter, the process may be terminated.

In contrast, when determining that the communication difficulty restricted area NF is present on the traveling route RA (Step S240: YES), the determiner 113A may determine whether the own vehicle V is approaching the communication difficulty area WR, based on the data received from the area information extractor 112 (Step S250).

When the determiner 113A determines that the own vehicle V is not approaching the communication difficulty area WR (Step S250: NO), the process may repeat Step S250.

In contrast, when determining that the own vehicle V is approaching the communication difficulty area WR (Step S250: YES), the determiner 113A may transmit data indicating that the own vehicle V is approaching the communication difficulty area WR to the notification controller 114A. The notification controller 114A may cause the notifier 130 to issue the notification indicating that the own vehicle V is to enter the restricted area GF to the portable terminal 30 (Step S260).

Thereafter, the notification controller 114A may store, in the recording unit 121A, the travel information based on the data on the position of the own vehicle V, on the travel information on the own vehicle V received form the travel information obtainer 151, and on the data on the time of passing through each transit point and the necessary time received from the necessary time calculator 152 (Step S270).

Based on the data received from the area information extractor 112, the determiner 113A may determine whether the own vehicle V is in the communication difficulty area WR or has passed through the communication difficulty area WR (Step S280).

When the determiner 113A determines that the own vehicle V is in the communication difficulty area WR (Step S280: YES), the process may repeat Step S280.

In contrast, when determining that the own vehicle V has passed through the communication difficulty area WR (Step S280: NO), the determiner 113A may transmit the data indicating that the own vehicle V has passed through the communication difficulty area WR to the notification controller 114A. The notification controller 114A may cause the notifier 130 to notify the portable terminal 30 of the travel information on the own vehicle V (Step S290). Thereafter the process may be terminated.

<Workings and Effects>

As described above, the in-vehicle apparatus 10A according to the second example embodiment includes the travel information obtainer 151 and the necessary time calculator 152. The travel information obtainer 151 acquires the travel information on the traveling route RA, and the necessary time calculator 152 calculates the necessary time t1 to travel from the approach determination point VP1, at which the preliminary notification is issued, to the communication difficulty area exit point WP2, which is an exit of the communication difficulty area, based on the travel information on the traveling route RA. The notifier 130 may notify the portable terminal 30 of the information including the necessary time t1 to travel from the approach determination point VP1, at which the preliminary notification is issued, to the communication difficulty area exit point WP2, at which the next notification is issued.

That is, based on the travel information on the traveling route RA received from the travel information obtainer 151, the necessary time calculator 152 may calculate the necessary time t1 by acquiring the time of passing through the respective transit points on the potential route along which the own vehicle V is likely to travel from the approach determination point VP1 to the communication difficulty area exit point WP2. Thereafter, at a time point when the own vehicle V has reached the communication difficulty area exit point WP2, the notification controller 114A may cause the notifier 130 to notify the portable terminal 30 of the information including the necessary time t1, which is the result of the calculation at the necessary time calculator 152.

Accordingly, it is possible to issue a notification to a predetermined notified part at an appropriate timing even when the restricted area GF on the traveling route RA is included in the communication difficulty area.

Further, the in-vehicle apparatus 10A according to the second example embodiment may notify the predetermined notified party of the status of entry of the own vehicle V into the restricted area GF at the time point when the own vehicle V has passed through the communication difficulty area WR in which the communication state is deteriorated. The status of entry of the own vehicle V into the restricted area GF notified by the notifier 130 may include the information regarding the passage of the own vehicle V through the restricted area GF or the stay of the own vehicle V in the restricted area GF.

That is, the travel information obtainer 151 may acquire the travel information regarding, for example, the transit points of the own vehicle V within the restricted area GF on the traveling route RA and the passing speeds of the own vehicle V at the transit points, and may store the travel information as the status of entry of the own vehicle V into the restricted area GF in the recording unit 121A. The necessary time calculator 152 may acquire the time of passing of the own vehicle V through the transit points within the restricted area GF on the traveling route RA, and may store the time of passing as the status of entry of the own vehicle V into the restricted area GF in the recording unit 121A. At the time point when the own vehicle V has passed through the communication difficulty area WR, the notification controller 114A may acquire, from the recording unit 121A, the status of entry of the own vehicle V into the restricted area GF, which includes the information regarding the passage of the own vehicle V through the restricted area GF or the stay of the own vehicle V in the restricted area GF, and may notify the portable terminal 30 of the status via the notifier 130.

Accordingly, it is possible to issue a notification to a predetermined notified party at an appropriate timing even when the restricted area GF on the traveling route RA is included in the communication difficulty area.

Note that it is possible to implement the in-vehicle apparatuses 10 and 10A of the example embodiments of the disclosure by recording the process to be executed by the processor units 100 and 100A on a non-transitory recording medium readable by a computer system, and causing the computer system to load the program recorded on the non-transitory recording medium onto the processor units 100 and 100A to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some of the example embodiments of the disclosure have been described in detail with reference to the accompanying drawings, the disclosure is not limited to these examples. It is apparent that those skilled in the art could have conceived of various modifications and variations within the scope of the technical idea described in the claims, and the technical scope of the disclosure should be understood as falling within the scope of the disclosure.

The invention claimed is:

1. An in-vehicle apparatus to be applied to a vehicle, the in-vehicle apparatus comprising:
a navigator configured to guide the vehicle in accordance with data on a determined traveling route;
an area information extractor configured to extract a communication difficulty area in which a communication state is deteriorated, and a restricted area set in advance as a geofence to the in-vehicle apparatus from the data on the determined traveling route, the area information extractor being configured to acquire data on at least one of an electric field strength of wireless communication between the vehicle and a server or an error rate of communication data, and to determine the communication difficulty area based on whether the at least one of the electric field strength and the error rate satisfies a predetermined condition;
a determiner configured to determine whether the restricted area is included in the communication difficulty area;
a notification controller configured to, when the restricted area is included in the communication difficulty area, issue a preliminary notification indicating that the vehicle is to enter the restricted area to a predetermined notified party before the vehicle enters the communication difficulty area, the preliminary notification being transmitted to the predetermined notified party via a communication network;
a travel information obtainer configured to acquire travel information on the determined traveling route, the travel information comprising at least times of passing transit points on the determined traveling route and speeds of the vehicle at the transit points; and
a necessary time calculator configured to calculate necessary time to be taken from issuing the preliminary notification to passing through the communication difficulty area, based on the travel information on the determined traveling route acquired by the travel information obtainer, the necessary time calculator being configured to calculate the necessary time based on the times of passing the transit points in the communication difficulty area and in the restricted area,
wherein the preliminary notification issued by the notification controller comprises time from the preliminary notification to a next notification to the predetermined notified party after the vehicle has passed through the communication difficulty area.

2. The in-vehicle apparatus according to claim 1, wherein the notification controller is configured to, at a time point when the vehicle has passed through the communication difficulty area, notify the predetermined notified party of a status of entry of the vehicle into the restricted area.

3. The in-vehicle apparatus according to claim 2, wherein the status of the entry of the vehicle into the restricted area comprises information regarding a passage of the vehicle through the restricted area or a stay of the vehicle in the restricted area.

4. An in-vehicle apparatus to be applied to a vehicle, the in-vehicle apparatus comprising:
one or more processors; and
one or more memories communicably coupled to the one or more processors, wherein
the one or more memories are configured to store data comprising map data on routes, data on a communication difficulty area in which a communication state is deteriorated, and data on a restricted area set in advance as a geofence,
the one or more processors are configured to:
guide the vehicle in accordance with data on a determined traveling route;
extract the communication difficulty area and the restricted area from the data on the determined traveling route, wherein the one or more processors are configured to acquire data on at least one of an electric field strength of wireless communication between the vehicle and a server or an error rate of communication data, and to determine the communication difficulty area based on whether the at least one of the electric field strength and the error rate satisfies a predetermined condition;
determine whether the restricted area is included in the communication difficulty area;
when the restricted area is included in the communication difficulty area, issue a preliminary notification indicating that the vehicle is to enter the restricted area to a predetermined notified party before the vehicle enters the communication difficulty area, the preliminary notification being transmitted to the predetermined notified party via a communication network;
acquire travel information on the determined traveling route, the travel information comprising at least times of passing transit points on the determined traveling route and speeds of the vehicle at the transit points; and
calculate necessary time to be taken from issuing the preliminary notification to passing through the communication difficulty area, based on the travel information on the determined traveling route, the one or more processors being configured to calculate the necessary time based on the times of passing the transit points in the communication difficulty area and in the restricted area, and
the preliminary notification comprises time from the preliminary notification to a next notification to the predetermined notified party after the vehicle has passed through the communication difficulty area.

* * * * *